United States Patent
Kotake et al.

(10) Patent No.: US 6,863,875 B1
(45) Date of Patent: Mar. 8, 2005

(54) FLUE GAS TREATING SYSTEM AND PROCESS

(75) Inventors: Shinichiro Kotake, Tokyo (JP); Kazuaki Kimura, Tokyo (JP); Kazumitsu Suzuki, Tokyo (JP); Naohiko Ukawa, Hiroshima (JP); Toru Takashina, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 396 days.

(21) Appl. No.: 09/658,928

(22) Filed: Sep. 11, 2000

Related U.S. Application Data (62) Division of application No. 09/058,965, filed on Apr. 13, 1998, now abandoned.

(51) Int. Cl.[7] .............................................. C01B 17/96
(52) U.S. Cl. ................ 423/235; 423/239.1; 423/242.1; 423/243.01; 423/243.02; 423/243.07; 423/243.08; 423/243.09
(58) Field of Search .............................. 423/235, 239.1, 423/243.01, 243.06, 243.08, 245.5, 242.1, 243.02, 243.07, 243.09

(56) References Cited

U.S. PATENT DOCUMENTS

| | | | |
|---|---|---|---|
| 3,660,045 A | 5/1972 | Gladu et al. ................. | 422/169 |
| 3,712,029 A | 1/1973 | Charlton et al. ....... | 55/DIG. 30 |
| 3,839,971 A | 10/1974 | Snelling et al. ............. | 110/8 R |
| 4,288,420 A * | 9/1981 | Ito et al. ..................... | 423/239 |
| 4,310,498 A | 1/1982 | Malki et al. ........... | 423/243.01 |
| 4,573,418 A | 3/1986 | Märzendorfer et al. ...... | 110/345 |
| 4,671,807 A | 6/1987 | Charlton ....................... | 55/100 |
| 5,024,171 A * | 6/1991 | Krigmont et al. ............ | 110/345 |
| 5,525,317 A | 6/1996 | Bhat et al. ................... | 423/235 |
| 5,567,226 A * | 10/1996 | Lookman et al. ................ | 95/3 |
| 5,603,909 A | 2/1997 | Varner et al. ............. | 423/239.1 |
| 5,795,548 A | 8/1998 | Madden et al. .............. | 422/171 |

FOREIGN PATENT DOCUMENTS

| | | |
|---|---|---|
| DE | 27 52 288 A1 | 5/1979 |
| DE | 36 36 554 A1 | 5/1988 |
| DE | 93 19 017.4 U1 | 3/1994 |
| DE | 9319017 U1 | 4/1994 |
| EP | 0 059 315 A2 | 9/1982 |
| EP | 0 232 976 A2 | 8/1987 |
| JP | 50-101247 B | 8/1975 |
| JP | 55-147134 | 11/1980 |
| JP | 57-188984 | 11/1982 |
| JP | 07-108131 | 4/1995 |
| JP | 07-112117 | 5/1995 |
| JP | 08-000951 | 1/1996 |

OTHER PUBLICATIONS

Kohl et al. *Gas Purification* 4th Ed. Gulf Publishing Co. USA, ISBN 0–87201–314–6, pp. 367–371, 1985.*
English Translation of DE G93 19 017.4 U1, Apr. 21, 1994.*
Perry et al. *Chemical Engineers' Handbook* (5th Ed.) McGraw–Hill Book Co. USA, ISBN 0–07–049478–9, pp. 9–50, 9–51 and 11–3 to 11–8, 1973.*

* cited by examiner

Primary Examiner—Wayne A. Langel
(74) Attorney, Agent, or Firm—Foley & Lardner LLP (57) ABSTRACT

In a flue gas treating system, an absorption tower (21), a reheating section (22) and a fan (23) are arranged in line on a vertical axis so as to function as at least a part of a stack for emitting the treated flue gas into the atmosphere. Moreover, in a flue gas treating process, the amount of ammonia injected in the denitration step (a denitrator (2)) and/or the amount of ammonia at a point downstream of the denitration step are determined so as to be on such an excessive level that ammonia or ammonium salt will remain in the flue gas introduced into the desulfurization step (absorption tower (21)). Thus, the size and cost of the equipment can be reduced.

17 Claims, 10 Drawing Sheets

FLUE GAS TREATING SYSTEM AND PROCESS

This is a division of U.S. application Ser. No. 09/058,965, filed Apr. 13, 1998 now abandoned.

FIELD OF THE INVENTION AND RELATED ART STATEMENT

This invention relates to a flue gas treating technique for effecting at least the denitration and desulfurization of flue gas. More particularly, it relates to a flue gas treating technique which makes it possible to reduce the size of the equipment and enhance the performance of the equipment.

Figure 9:
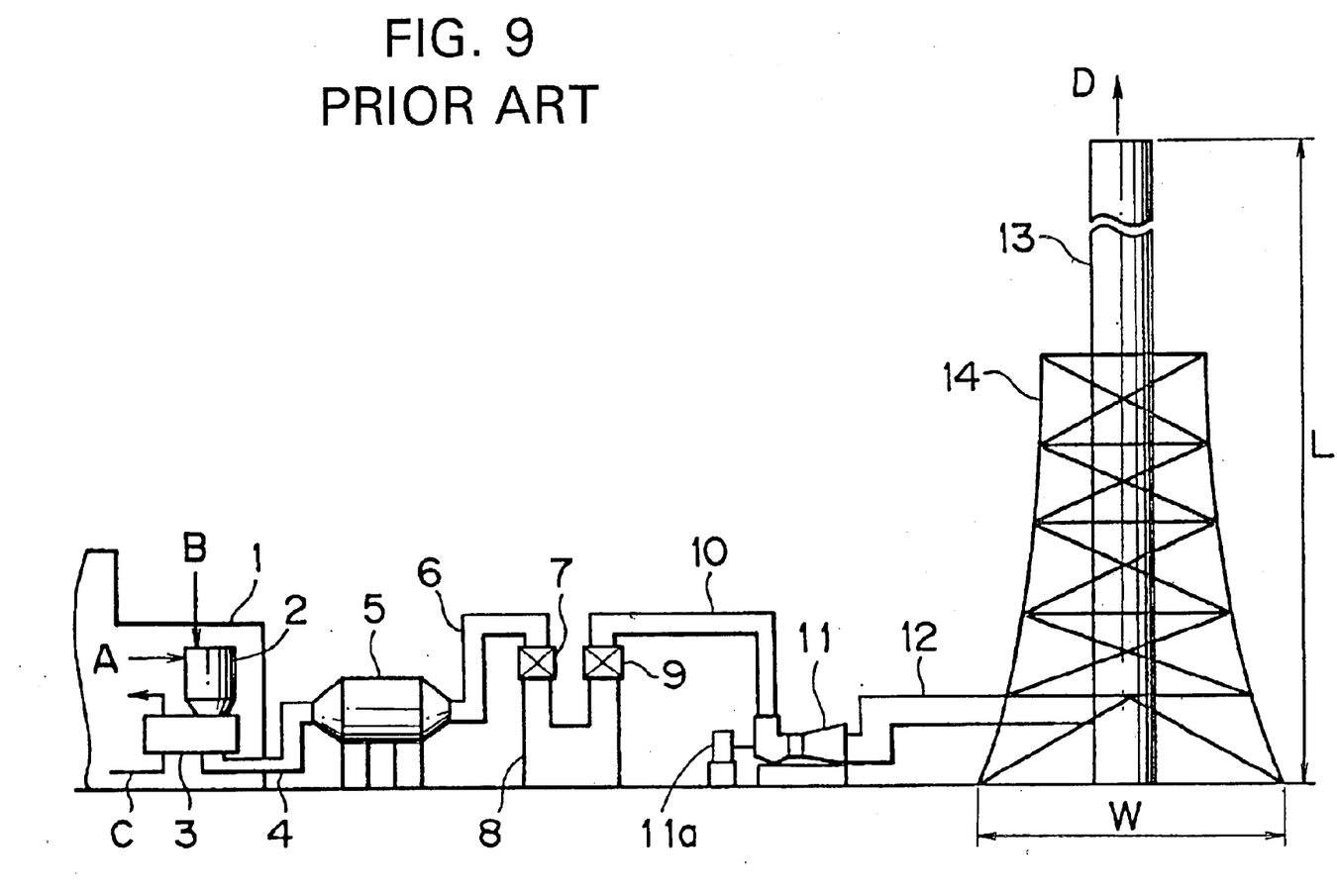
FIG. 9 is a schematic view illustrating a conventional flue gas treating system.
Figure 10:
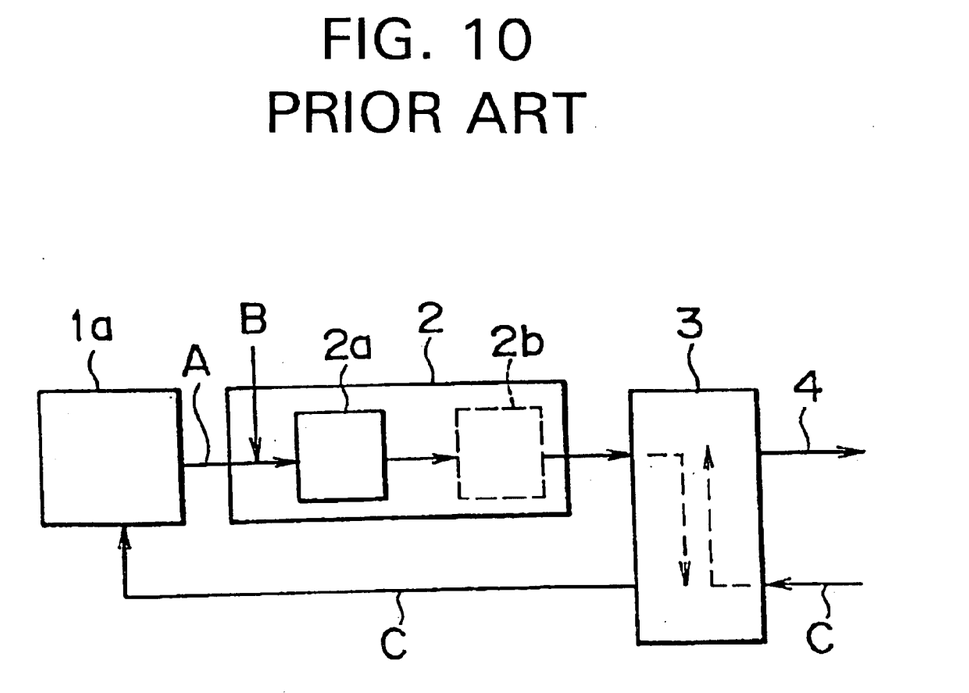
FIG. 10 is a schematic view illustrating the denitrator and other apparatus included in the conventional flue gas treating system.

Conventionally, in order to remove nitrogen oxides, sulfur oxides (typically sulfur dioxide) and dust (e.g., fly ash) present in flue gas discharged from a boiler of a thermal electric power plant or the like, an exemplary flue gas treating system or process as illustrated in FIGS. 9 and 10 is widely employed. This flue gas treating technique is described hereinbelow.

As illustrated in FIG. 9, untreated flue gas A discharged from a boiler (not shown in FIG. 9) is first introduced into a denitrator 2 installed in a boiler house 1, so that nitrogen oxides present in the flue gas are decomposed. Denitrator 2 functions to decompose nitrogen oxides according to the catalytic ammonia reduction method using a catalyst. In this step, it has been conventional practice to inject ammonia B into the flue gas in an amount almost equal to the equivalent amount required for denitration. The amount of ammonia slipping to the downstream side of denitrator 2 is as slight as about 5 ppm.

Then, the flue gas is introduced into an air heater (or heat exchanger) 3 also installed in boiler house 1. Thus, heat is recovered from the flue gas and used to heat air C supplied to the boiler. Conventionally, a heat exchanger of the so-called Ljungström type has been used as air heater 3.

The flue gas leaving this air heater 3 is subsequently conducted out of boiler house 1 by a flue 4 and introduced into a dry electrostatic precipitator 5 installed outside boiler house 1. In this electrostatic precipitator 5, dust present in the flue gas is captured and removed.

In the case of an oil-fired boiler, ammonia may also be injected-into the flue gas in flue 4 so that sulfur trioxide ($SO_3$) present in the flue gas may be captured as ammonium sulfate [$(NH_4)_2SO_4$] in electrostatic precipitator 5. On the other hand, in the case of a coal-fired boiler, a large amount of dust such as fly ash is present in the flue gas, so that $SO_3$ present in the flue gas does not form a harmful mist (submicron particles), but remains in a state condensed on the dust particles and captured in electrostatic precipitator 5 and an absorption tower 8 which will be described later. Accordingly, in the case of a coal-fired boiler, the injection of ammonia in flue 4 is generally omitted.

Then, the flue gas leaving electrostatic precipitator 5 is conducted through a flue 6 and introduced into the heat recovery section (or heat exchanger) 7 of a gas-gas heater where heat is recovered therefrom. Thereafter, the flue gas is introduced into an absorption tower 8 serving as a desulfurizer. In this absorption tower 8, the flue gas is brought into gas-liquid contact with an absorbing fluid having an absorbent (e.g., limestone) suspended therein (hereinafter referred to as the absorbent slurry), so that chiefly $SO_2$ present in the flue gas is absorbed into the absorbent slurry and, moreover, the residual dust is also captured by the absorbent slurry. In a tank provided at the bottom of absorption tower 8, the slurry having $SO_2$ absorbed therein is oxidized to form gypsum as a by-product according to the following reactions including a neutralization reaction.

(Absorption Tank)

$$SO_2 + H_2O \rightarrow H^+ + HSO_3^- \qquad (1)$$

(Tank)

$$H^+ + HSO_3^- + \tfrac{1}{2}O_2 \rightarrow 2H^+ + SO_4^{2-} \qquad (2)$$

$$2H^+ + SO_4^{2-} + CaCO_3 + H_2O \rightarrow CaSO_4 \cdot 2H_2O + CO_2 \qquad (3)$$

Then, the flue gas from which $SO_2$ and the like have been removed in absorption tower 8 serving as a desulfurizer is passed through the reheating section 9 of the gas-gas heater, where it is heated to a temperature favorable for emission into the atmosphere by using the heat recovered in heat recovery section 7. Thereafter, the flue gas is introduced into the lower part of the main body of a stack 13 by way of a flue 10, a fan 11 and a flue, and finally discharged, as treated flue gas D, from the upper opening of the main body 13 of the stack into the atmosphere. Fan 11 functions to deliver the flue gas under pressure so as to counteract the pressure loss caused by the equipment, and eventually allows the flue gas to be emitted into the atmosphere through the main body of stack 13. Conventionally, a motor 11a has been installed separately from the main body of fan 11. For the same purpose, another similar fan may be installed on the upstream side of absorption tower 8.

Moreover, in this system, the required height (L) of the main body of stack 13 above the ground is uniquely determined according to the concentrations of nitrogen oxides and sulfur oxides remaining in treated flue gas D and the concentration of dust remaining therein, so as to meet the standards for emission into the atmosphere. For example, on the basis of conventional performance (i.e., a degree of denitration of a little greater than 80% and a degree of desulfurization of a little greater than 80%), a height (L) of about 150 m has generally been required for electric power plants of the 150 MW class. In this case, the ground space required for the installation of the stack, including a framework 14 for supporting and reinforcing the main body of stack 13, must usually be in the form of a square with sides having a length (W) of about 38 m.

FIG. 10 is a block diagram illustrating the system construction extending from the boiler to air heater 3. In this FIG. 10, the boiler is designated by numeral 1a, the denitration catalyst contained in denitrator 2 by numeral 2a, and the ammonia decomposition catalyst contained in denitrator 2 by numeral 2b. Ammonia decomposition catalyst 2b is used to eliminate any ammonia slipping to the downstream side. However, when ammonia is injected in ordinary amounts, this catalyst is omitted because the amount of slipping ammonia is very slight. Moreover, as described previously, a heat exchanger of the Ljungström type has been used as air heater 3. In this system, therefore, a portion (e.g., about 5% based on the volume of the flue gas) of the supplied air C leaks to the side of the flue gas and, at the same time, a portion (e.g., about 1%) of the flue gas leaks to the side of air C, as shown by broken lines in FIG. 10.

In the above-described conventional flue gas treatment, the large-sized and high-cost equipment has been disadvantageous. Especially in the markets of developing countries, small-scale power generation enterprises and the like, a marked reduction in cost has been strongly desired in addition to a reduction in installation space and stack height.

Specifically, the arrangement and construction of the conventional system has been such that, between boiler house 1 and stack 13, electrostatic precipitator 5, absorption tower 8 and fan 11 are arranged in a horizontal direction and connected by flues 4, 6, 10 and 12. This requires an ample space between boiler house 1 and stack 13, and a plurality of flues and a large number of supporting members therefor, resulting in an increased cost.

Moreover, as described previously, the height and installation space of the stack are uniquely determined, for example, according to the concentrations of nitrogen oxides and sulfur oxides remaining in treated flue gas D. Consequently, in order to reduce the size of the stack, it is ultimately required to enhance the performance of the equipment. This has also been difficult in the construction of the conventional system. For example, in order to enhance the degree of desulfurization, it is conceivable to increase the gas-liquid contact capacity simply by enlarging absorption tower 8. However, this is contrary to the desire for a reduction in size and hence has a certain limit.

Furthermore, in order to enhance the degree of denitration in denitrator 2, it is conceivable to accomplish this simply by increasing the amount of ammonia injected. In such a case, the conventional system has used ammonia decomposition catalyst 2b in order to remove any ammonia slipping to the downstream side, resulting in a corresponding increase in cost. If ammonia decomposition catalyst 2b is not used in such a case, ammonia will slip to the downstream side and exert the following adverse effect.

That is, if ammonia remains in the flue gas, highly adherent acid ammonium sulfate ($NH_4HSO_4$) is produced according to the reaction formula (4) given below. The dew point of acid ammonium sulfate is about 230° C. under ordinary conditions in this type of equipment, while the flue gas is cooled from about 350° C. to about 130° C. in an ordinary air heater. Consequently, when ammonia remains in the flue gas leaving denitrator 2, a large amount of acid ammonium sulfate ($NH_4HSO_4$) will be produced especially in this air heater. An investigation conducted by the present inventors has revealed that, in a conventional air heater of the Ljungström type, this acid ammonium sulfate tends to become deposited in the gaps of the heat reservoir within the air heater and hence requires frequent maintenance operations such as cleaning.

$$SO_3 + NH_3 + H_2O \rightarrow NH_4HSO_4 \quad (4)$$

Accordingly, a first object of the present invention is to provide a flue gas treating system in which the arrangement and construction of the equipment is improved so as to achieve a reduction in the size and cost of the equipment.

A second object of the present invention is to provide a flue gas treating process which makes it possible to enhance the flue gas treating performance and thereby achieve a reduction in the size of the equipment and the like.

A third object of the present invention is to provide a flue gas treating process which can achieve the aforesaid reduction in equipment size and enhancement in performance without detracting from its maintainability.

A fourth object of the present invention is to provide a flue gas treating process in which the arrangement and construction of the equipment is improved and the flue gas treating performance is enhanced, whereby a marked reduction in the size and cost of the equipment, including a reduction in the size of the stack, can be achieved.

In order to accomplish the above objects, the present invention provides a flue gas treating system comprising an absorption tower for bringing flue gas into gas-liquid contact with an absorbing fluid to remove at least sulfur oxides from the flue gas by absorption into the absorbing fluid, a reheating section for heating the flue gas leaving the absorption tower to a temperature favorable for emission into the atmosphere, and a fan for delivering the flue gas under pressure so as to counteract the pressure loss caused by the flue gas flow path including the absorption tower and the reheating section, wherein the absorption tower, the reheating section and the fan are arranged in line on a vertical axis so as to function as at least a part of a stack for emitting the treated flue gas into the atmosphere.

The present invention also provides a flue gas treating process comprising the denitration step of injecting ammonia into flue gas containing at least nitrogen oxides and sulfur oxides to decompose the nitrogen oxides present in the flue gas, and the desulfurization step of introducing the flue gas leaving the denitration step into an absorption tower where it is brought into gas-liquid contact with an absorbing fluid to remove at least the sulfur oxides from the flue gas by absorption into the absorbing fluid, wherein ammonia is injected into the flue gas as required at a point downstream of the denitration step, and the amount of ammonia injected in the denitration step and/or the amount of ammonia injected at the point downstream of the denitration step are determined so as to be on such an excessive level that ammonia or an ammonium salt will remain in the flue gas introduced into the desulfurization step.

In the flue gas treating process of the present invention, the amount of ammonia injected in the denitration step may be determined so that the concentration of ammonia remaining in the flue gas leaving the denitration step will be not less than 30 ppm.

The flue gas treating process of the present invention may further include the heat recovery step of introducing the flue gas leaving the denitration step into a heat exchanger on the upstream side of the absorption tower and thereby recovering heat from the flue gas, and a non-leakage type heat exchanger of shell-and-tube structure may be employed as the heat exchanger.

The flue gas treating process of the present invention may further include the heat recovery step of introducing the flue gas leaving the denitration step into a heat exchanger on the upstream side of the absorption tower and thereby recovering heat from the flue gas, and the amount of ammonia injected in the denitration step and/or the amount of ammonia injected at the point downstream of the denitration step may be determined so that the concentration of ammonia remaining in the flue gas introduced into the heat exchanger will be in excess of the $SO_3$ concentration in this flue gas by 13 ppm or more.

In the flue gas treating process of the present invention, a region in which a liquid having higher acidity than the absorbing fluid is sprayed so as not to allow ammonia to be easily released into the gaseous phase is created on the downstream side of the region of the absorption tower in which the flue gas is brought into gas-liquid contact with the absorbing fluid, whereby the ammonia remaining in the flue gas introduced into the desulfurization step is absorbed in the absorption tower without allowing it to remain in the flue gas leaving the absorption tower.

The flue gas treating process of the present invention may further include the first dust removal step of introducing the flue gas into a dry electrostatic precipitator on the upstream side of the absorption tower and thereby removing dust present in the flue gas, and the second dust removal step of introducing the flue gas into a wet electrostatic precipitator on the downstream side of the absorption tower and thereby removing the dust remaining in the flue gas.

The present invention also provides a flue gas treating process for purifying flue gas containing at least nitrogen oxides and sulfur oxides by using a flue gas treating system comprising a denitrator for injecting ammonia into the flue gas to decompose the nitrogen oxides present therein, a heat exchanger for recovering heat from the flue gas leaving the denitrator, an absorption tower for bringing the flue gas leaving the heat exchanger into gas-liquid contact with an absorbing fluid to remove at least the sulfur oxides from the flue gas by absorption into the absorbing fluid, a reheating section for heating the flue gas leaving the absorption tower to a temperature favorable for emission into the atmosphere by using at least a part of the heat recovered in the heat exchanger, and a fan for delivering the flue gas under pressure so as to counteract the pressure loss caused by the flue gas flow path including the absorption tower and the reheating section, the absorption tower, the reheating section and the fan being arranged in line on a vertical axis so as to function as at least a part of a stack for emitting the treated flue gas into the atmosphere, wherein ammonia is injected into the flue gas as required at a point downstream of the denitrator, and the amount of ammonia injected in the denitrator and/or the amount of ammonia injected at the point downstream of the denitrator are determined so as to be on such an excessive level that ammonia or an ammonium salt will remain in the flue gas introduced into the absorption tower.

In the flue gas treating system of the present invention, the absorption tower, the reheating section and the fan are arranged in line on a vertical axis so as to function as at least a part of a stack for emitting the treated flue gas into the atmosphere. Thus, all of these apparatus or devices which have conventionally been installed on the outside of the framework for the stack are installed in the space inside the framework for the stack. Consequently, the installation space of the whole equipment is significantly reduced, so that a marked reduction in the size of the equipment in horizontal directions can be achieved. Moreover, a considerable portion of the flues and its supporting members becomes unnecessary, and the main body of the stack becomes much shorter than before. Eventually, a marked reduction in equipment cost is achieved.

In the flue gas treating process of the present invention, ammonia is injected into the flue gas as required at a point downstream of the denitration step, and the amount of ammonia injected in the denitration step and/or the amount of ammonia injected at the point downstream of the denitration step are determined so as to be on such an excessive level that ammonia or an ammonium salt will remain in the flue gas introduced into the desulfurization step.

Consequently, at least the degree of desulfurization in the desulfurization step is enhanced and this eventually contribute to a reduction in the sizes of the absorption tower and the stack.

In particular, when the amount of ammonia injected in the denitration step is determined so that the concentration of ammonia remaining in the flue gas leaving the denitration step will be not less than 30 ppm, especially the degree of denitration in the denitration step is markedly enhanced and this eventually contributes to a reduction in the size of the stack.

Moreover, when the flue gas treating process of the present invention further includes the heat recovery step of introducing the flue gas leaving the denitration step into a heat exchanger on the upstream side of the absorption tower and thereby recovering heat from the flue gas, and a non-leakage type heat exchanger of shell-and-tube structure is employed as the heat exchanger, the heat of the flue gas can be effectively utilized in the conventional manner to preheat air for use in the boiler or reheat the treated flue gas, and troubles due to scale formation can be lessened.

That is, even if acid ammonium sulfate formed by the reaction of the injected ammonia with $SO_3$ present in the flue gas, and sulfuric acid mist formed from $SO_3$ present in the flue gas condense in the aforesaid heat exchanger, a non-leakage type heat exchanger of shell-and-tube structure is less subject to the deposition of such materials on the heat transfer surfaces and the like or clogging with them, as compared with a conventionally used heat exchanger of the Ljungström type.

Moreover, in this case, the heat exchanger does not allow air to leak into the flue gas. This can reduce the amount of flue gas to be treated and hence achieve a reduction in cost.

Furthermore, when the flue gas treating process of the present invention further includes the heat recovery step of introducing the flue gas leaving the denitration step into a heat exchanger on the upstream side of the absorption tower and thereby recovering heat from the flue gas, and the amount of ammonia injected in the denitration step and/or the amount of ammonia injected at the point downstream of the denitration step is determined so that the concentration of ammonia remaining in the flue gas introduced into the heat exchanger will be in excess of the $SO_3$ concentration in this flue gas by 13 ppm or more, the condensation of acid ammonium sulfate in the aforesaid heat exchanger is minimized and a fine powder of neutral ammonium sulfate is chiefly produced. Consequently, the formation of scale due to acid ammonium sulfate is markedly suppressed and this makes the maintenance of the heat exchanger very easy.

Furthermore, when a region in which a liquid having higher acidity than the absorbing fluid is sprayed so as not to allow ammonia to be easily released into the gaseous phase is created on the downstream side of the region of the absorption tower in which the flue gas is brought into gas-liquid contact with the absorbing fluid, whereby the ammonia remaining in the flue gas introduced into the desulfurization step is absorbed in the absorption tower without allowing it to remain in the flue gas leaving the absorption tower, an adverse effect due to the excessive injection of ammonia (i.e., the emission of ammonia into the atmosphere) can be avoided. This serves to cope with future ammonia emission standards and also contributes to further purification of flue gas.

Furthermore, when the flue gas treating process of the present invention further includes the first dust removal step of introducing the flue gas into a dry electrostatic precipitator on the upstream side of the absorption tower and thereby removing dust present in the flue gas, and the second dust removal step of introducing the flue gas into a wet electrostatic precipitator on the downstream side of the absorption tower and thereby removing the dust remaining in the flue gas, the dedusting capability of the whole system is markedly improved.

The other flue gas treating process of the present invention is one for purifying flue gas containing at least nitrogen oxides and sulfur oxides by using a flue gas treating system comprising a denitrator, a desulfurizer and the like, and having an absorption tower (serving as the desulfurizer), a reheating section and a fan arranged in line on a vertical axis so as to function as at least a part of a stack for emitting the treated flue gas into the atmosphere, wherein ammonia is injected into the flue gas as required at a point downstream of the denitrator, and the amount of ammonia injected in the denitrator and/or the amount of ammonia injected at the point downstream of the denitrator are determined so as to be on such an excessive level that ammonia or an ammonium salt will remain in the flue gas introduced into the absorption tower.

Thus, since the absorption tower, the reheating section and the fan are arranged in line on a vertical axis so as to form part of the stack, the installation space of the equipment is markedly reduced. Moreover, at least the degree of desulfurization is enhanced owing to the excessive injection of ammonia, and this eventually causes a reduction in stack height. That is, this process can produce excellent effects such as an enhancement in the performance of the equipment and a marked reduction in the size of the equipment in both horizontal and vertical directions.

DETAILED DESCRIPTION OF PREFERRED EMBODIMENTS

Several embodiments of the present invention will be described hereinbelow with reference to the accompanying drawings.

First Embodiment

Figure 1:
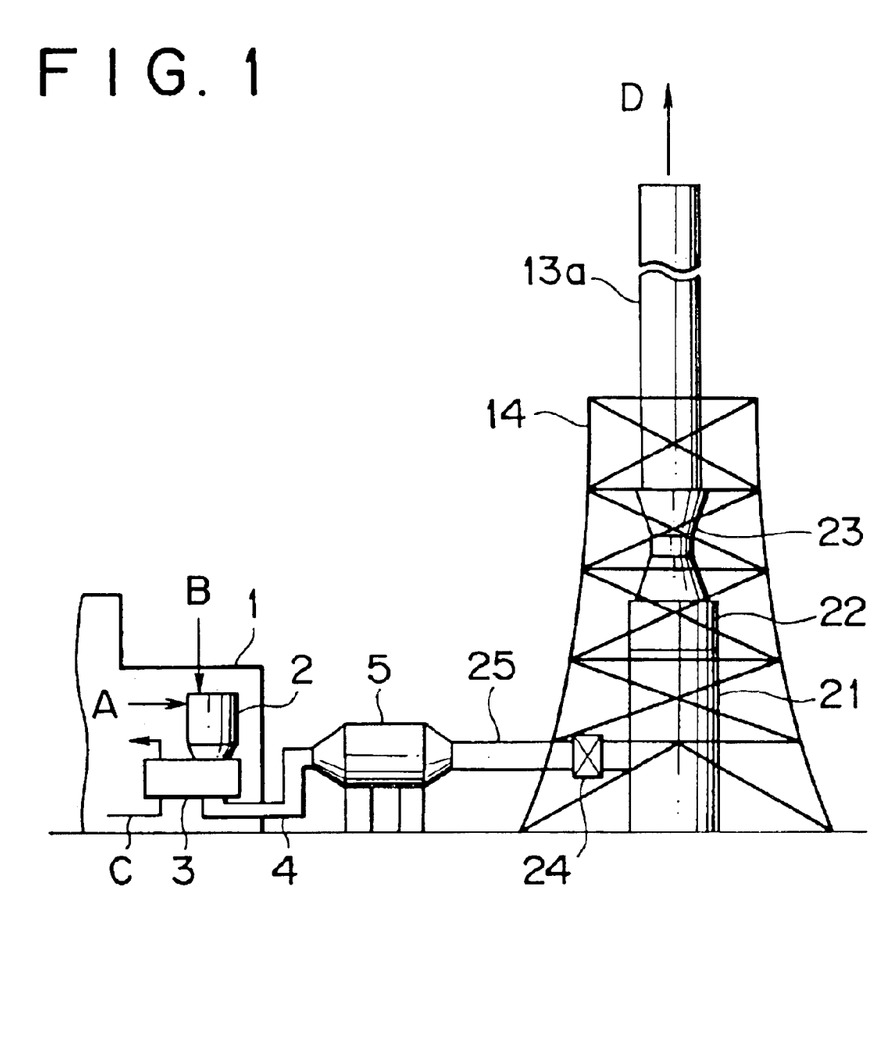
FIG. 1 is a schematic view illustrating a flue gas treating system in accordance with a first embodiment of the present invention.

A first embodiment of the present invention is described with reference to FIG. 1. The same elements as included in the conventional system of FIG. 9 are designated by the same reference numerals, and the duplicate explanation thereof is omitted.

The flue gas treating system of this embodiment is characterized in that, below the main body 13a of a stack, an absorption tower 21, the reheating section 22 of a gas-gas heater, and a fan 23 are arranged in line on the vertical axis of the stack so as to form part of the stack.

The heat recovery section 24 of the gas-gas heater is installed at a position which is on the way of a flue 25 connecting a dry electrostatic precipitator 5 with absorption tower 21 and on the inside of the framework 14 for the stack. Eventually, all of absorption tower 21, the heat recovery section 24 and reheating section 22 of the gas-gas heater, and fan 23 are all installed in an unoccupied space on the inside of the framework 14 for the stack.

In this embodiment, absorption tower 21 is such that the flue gas is introduced thereinto through an inlet formed in the lower lateral part thereof, brought into gas-liquid contact with an absorbing fluid in a countercurrent manner to remove at least sulfur oxides from the flue gas by absorption into the absorbing fluid, and discharged from an outlet formed at the upper end thereof. In the same manner as described previously in connection with the conventional system, gypsum is formed as a by-product by using, for example, limestone as the absorbent.

The reheating section 22 of the gas-gas heater is directly connected to the upper end of absorption tower 21. Thus, the flue gas discharged from the upper outlet of absorption tower 21 is introduced into reheating section 22 from the bottom side, heated to a temperature favorable for emission into the atmosphere by using the heat recovered in heat recovery section 24, and discharged from the top side.

In this case, a gas-gas heater of the heating medium circulation type is used, and its heat recovery section 24 and reheating section 22 comprise non-leakage type heat exchangers of shell-and-tube structure. These non-leakage type heat exchangers are advantageous in that, even if $SO_3$ present in the flue gas reacts with ammonia present therein according to the aforementioned reaction formula (4) to produce acid ammonium sulfate ($NH_4HSO_4$), they are less subject to the deposition of acid ammonium sulfate which tends to be responsible for scale formation.

Fan 23 is an axial-flow fan installed above the aforesaid reheating section 22 and functioning to suck the flue gas from the bottom side and discharge it from the top side. The motor is disposed on its internal axis.

In the arrangement and construction of the flue gas treating system according to this embodiment, the installation space of the whole equipment is significantly reduced as compared with the conventional system illustrated in FIG. 9, so that a marked reduction in the size of the equipment in horizontal directions can be achieved. Specifically, all of the space required for the installation of absorption tower 8, fan 11 and flues 6 and 10 in the system of FIG. 9 becomes unnecessary. Moreover, the installation space of the stack is the same as before, because a space allowing absorption tower 21 and the like to be installed has conventionally been left in the framework 12 for the stack.

Furthermore, flues 6 and 10 themselves and their supporting members become unnecessary, and the main body of stack 13a becomes much shorter than before. Eventually, a marked reduction in equipment cost is achieved.

Second Embodiment

Next, a second embodiment of the present invention is described with reference to FIG. 2. The same elements as included in the first embodiment are designated by the same reference numerals, and the duplicate explanation thereof is omitted.

This embodiment is characterized in that it is equipped with an air heater (or heat exchanger) 31 comprising a non-leakage type heat exchanger of shell-and-tube structure, and a wet electrostatic precipitator 32 is installed between absorption tower 21a and reheating section 22. In this embodiment, the aforesaid air heater 31 and the previously described heat recovery section 24 of the gas-gas heater constitute a heat exchanger for carrying out the heat recovery step of the present invention. Moreover, the dry electrostatic precipitator 5 described in connection with the conventional system serves to carry out the first dust removal step of the present invention, and the aforesaid wet electrostatic precipitator 32 serves to carry out the second dust removal step of the present invention.

The above-described construction has the following advantages. First of all, since air heater 31 comprises a non-leakage type heat exchanger, the amount of scale deposited is relatively small even if acid ammonium sulfate is produced in the flue gas introduced into air heater 31 as described previously. This is very advantageous from the viewpoint of maintenance.

More specifically, as described previously, when ammonia remains in the flue gas leaving denitrator 2, acid ammonium sulfate is produced especially in air heater 31. According to an investigation conducted by the present inventors, it has been found that, in the case of a conventional air heater of the Ljungström type, such acid ammonium sulfate tends to become deposited in the gaps of the heat reservoir within the air heater and requires frequent maintenance operations such as cleaning.

However, an investigation conducted by the present inventors has revealed that non-leakage type heat exchangers of shell-and-tube structure are less subject to such deposition of acid ammonium sulfate or clogging with it. It has also be known that the problem concerning the production of acid ammonium sulfate and its deposition on the inner surfaces of the heat exchanger can also be lightened by injecting an excessive amount of ammonia into the flue gas, and this will be specifically described later.

Moreover, when air heater 31 comprises a non-leakage type heat exchanger, air C fed to the boiler does not leak into the flue gas. This causes a decrease in the flow rate of the flue gas being treated and hence a corresponding reduction in the capacities of fan 23 and the flues and in power consumption.

Furthermore, since wet electrostatic precipitator 32 is installed, the fine dust and other foreign matter which were not captured in absorption tower 21a can be removed. Thus, the residual dust concentration in treated flue gas D is reduced. This enhances the performance of the equipment in that respect and also contributes to a reduction in stack height.

Next, the construction and effects of the characteristic parts of the flue gas treating process of the present invention, which is carried out by using the flue gas treating system of the above-described embodiment, are described hereinbelow.

According to this process, instead of using an ammonia decomposition catalyst, the amount of ammonia B injected in denitrator 2 is determined so as to be on such an excessive level that a large amount of ammonia or an ammonium salt will remain in the flue gas introduced into absorption tower 21a.

If ammonia or an ammonium salt remains in the flue gas introduced into absorption tower 21a, this ammonia or ammonium salt is dissolved in the slurry within absorption tower 21a as a result of gas-liquid contact between the flue gas and the absorbent slurry. This raises the ammonium salt concentration (in other words, ammonium ion concentration) in the liquid phase of the slurry circulating through absorption tower 21a.

Figure 5:
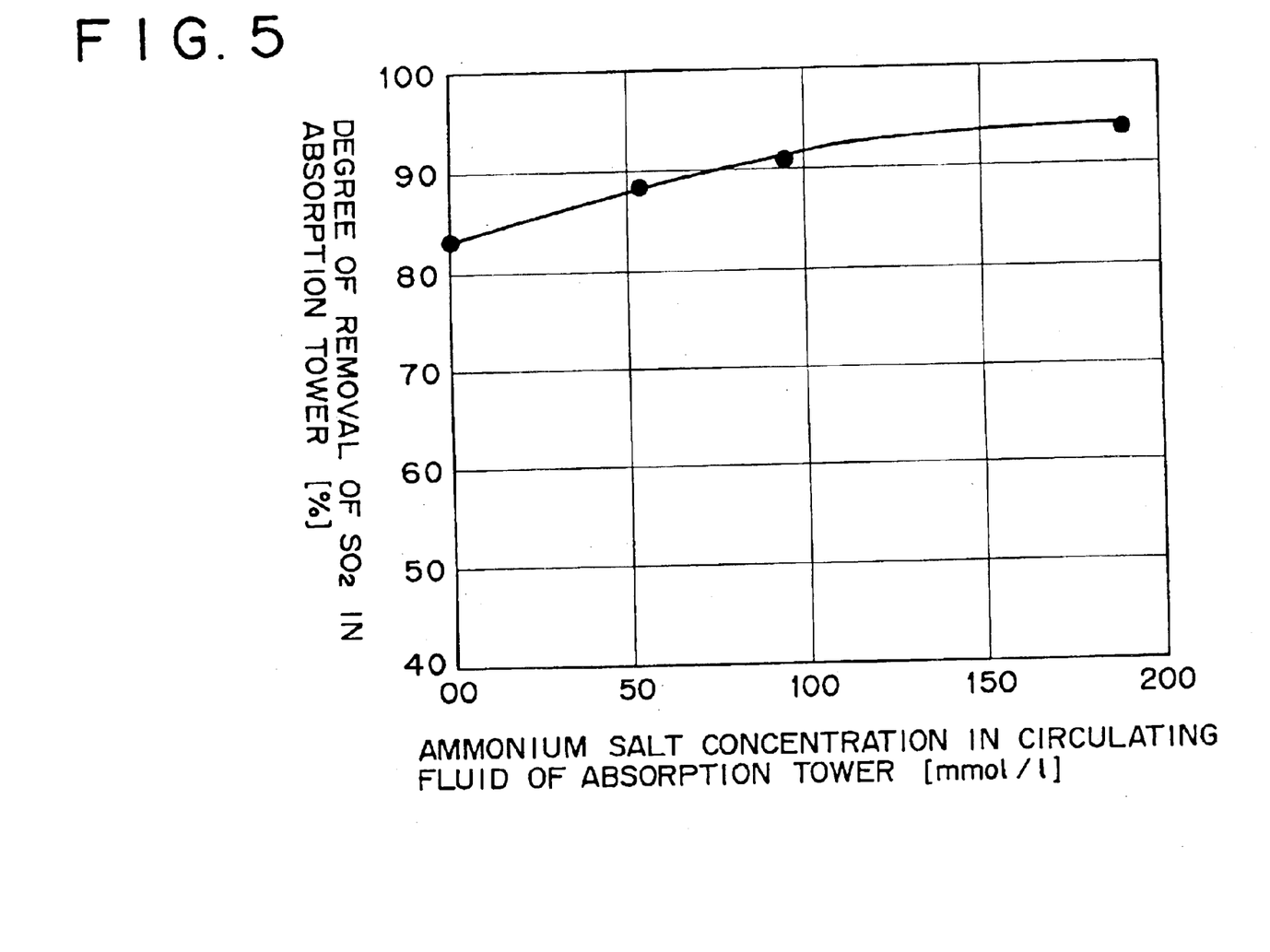
FIG. 5 is a graph showing data which demonstrate an effect of the present invention (i.e., an improvement in degree of desulfurization)

An investigation conducted by the present inventors has revealed that, when the ammonium salt concentration (or ammonium ion concentration) in the circulating fluid of the absorption tower is increased to 150 mmol/liter or more, the degree of removal of sulfur dioxide from the flue gas (i.e., the degree of desulfurization) in the absorption tower rises to the vicinity of 95% as shown in FIG. 5, even if the other conditions remain constant. Consequently, according to this embodiment in which the amount of ammonia B injected in denitrator 2 is determined so as to be on an excessive level as described above, the size of absorption tower 21a can be reduced as compared with the prior art. Moreover, the concentration of sulfur oxides (typically sulfur dioxide) remaining in treated flue gas D can further be reduced and, therefore, the height of the stack can be reduced.

Furthermore, since the amount of ammonia B injected is naturally in excess of the equivalent amount required for denitration, the denitration capability of denitrator 2 (or the denitration step) is enhanced. According to an investigation conducted by the present inventors, it has been found that, if the amount of ammonia B injected is determined so that it is in excess of the equivalent amount required for denitration and, moreover, the concentration of ammonia remaining in the flue gas leaving the denitration step (i.e., slip ammonia) will be not less than 30 ppm, the degree of denitration is enhanced from the conventional level of about 80% to about 90% and the concentration of nitrogen oxides remaining in treated flue gas D can be reduced to half.

In this connection, trial calculations made by the present inventors with respect to an electric power plant of the 150 MW class indicate that, if the degree of desulfurization and the degree of denitration are enhanced as described above, and the degree of dust removal is also enhanced by the installation of wet electrostatic precipitator 32, the stack height (L1) can be markedly reduced from the conventional value of about 150 m to about 90 m. Moreover, in consequence of that, the width (W1) of the installation space of framework 14b for the stack can be markedly reduced from the conventional value of about 38 m to about 25 m.

In this case, the particular amount of ammonia B injected must be determined not only so as to be in excess of the equivalent amount required for denitration, but also with consideration for the $SO_3$ concentration in the flue gas.

Specifically, at least a portion of the ammonia remaining in the flue gas leaving denitrator 2 (or the denitration step) reacts with $SO_3$ present in this flue gas to form ammonium salts such as the above-described ammonium sulfate and acid ammonium sulfate. In this case, most of these ammonium salts are captured by electrostatic precipitator 5. Consequently, of the ammonia gas remaining in the flue gas leaving denitrator 2, only that portion of ammonia gas which is in excess of the equivalent amount for $SO_3$ remains in the flue gas introduced into absorption tower 21a.

More specifically, it is desirable to determine the amount of ammonia injected so that the concentration of ammonia remaining in the flue gas introduced into air heater 31 and the heat recovery section (or heat exchanger) 24 of the gas-gas heater will be in excess of the $SO_3$ concentration in this flue gas by 13 ppm or more.

As demonstrated by experiments which will be described later, this makes it possible to suppress the deposition of acid ammonium sulfate condensing in the aforesaid heat exchanger. Thus, the formation of a deposit (or scale) on the heat transfer surfaces and other inner surfaces of the heat exchanger becomes slight and facilitates the maintenance of the heat exchanger.

That is, in the conventional system illustrated in FIG. 9, the concentration of ammonia remaining in the flue gas introduced into air heater 3 is as slight as about 5 ppm, so that acid ammonium sulfate is produced in a larger amount than common ammonium sulfate. This acid ammonium sulfate tends to condense especially in air heater 3 and form scale therein. However, if this ammonia concentration is in excess of the $SO_3$ concentration in the flue gas by 13 ppm or more, most of the $SO_3$ present in the flue gas is converted into a fine powder of neutral ammonium sulfate containing $(NH_4)_2SO_4$ and the production of highly adherent acid ammonium sulfate tending to form scale becomes relatively little. Moreover, according to this embodiment using air heater 31 of shell-and-tube structure, troubles due to scale formation are less as compared with the conventional system using an air heater of the Ljungström type. Eventually, the problem of scale formation due to acid ammonium sulfate can be practically solved and the denitrator need not be provided with an ammonia decomposition catalyst.

In this embodiment, an excessive amount of ammonia is positively injected so that a large amount of ammonia or an ammonium salt will remain in the flue gas introduced into absorption tower 21*a*. Accordingly, the disposal of ammonia absorbed into the slurry within absorption tower 21*a* and the ammonia leaking into treated flue gas D pose problems. However, these problems can be solved by employing the existing no-waste water disposal technique (the so-called AWMT) in which ammonia is recovered and reused by mixing dust from the electrostatic precipitator with waste water from the desulfurizer, or an ammonia absorption technique newly devised by the present inventors.

Figure 3:
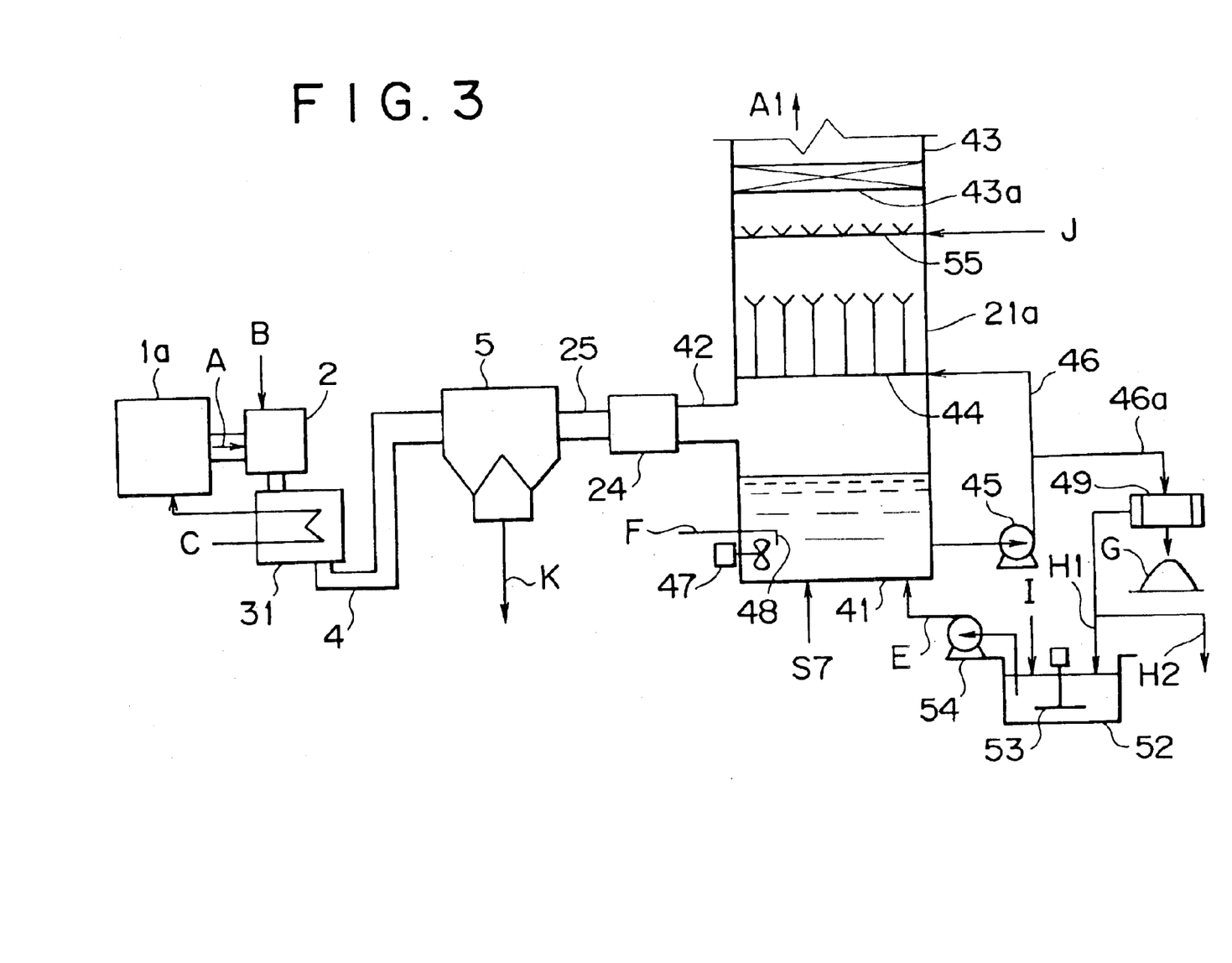
FIG. 3 is a schematic view illustrating the details of the desulfurizer included in the flue gas treating system of FIG. 2.
Figure 4:
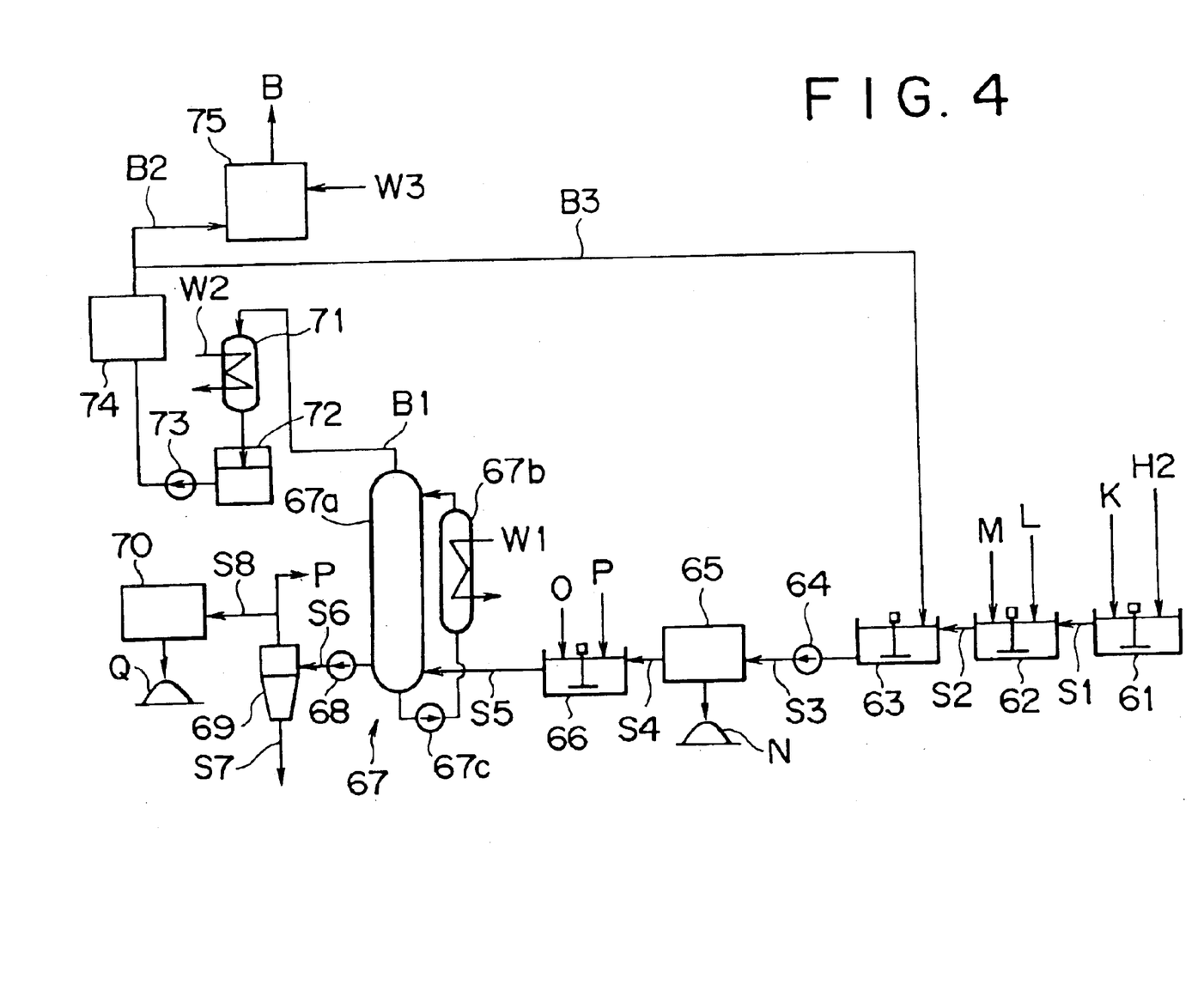
FIG. 4 is a schematic view illustrating a no-waste water disposal system suitable for use with the flue gas treating system of FIG. 2.

Some embodiments of these techniques are described below with reference to FIGS. 3 and 4. FIG. 3 is a schematic view showing, in particular, the detailed construction of a desulfurizer suitable for use in the flue gas treating system of this embodiment as illustrated in FIG. 2, and FIG. 4 is a schematic view showing the construction of an exemplary no-waste water disposal system suitable for use with the flue gas treating system of this embodiment (in the case of an oil-fired boiler).

In this case, as illustrated in FIG. 3, absorption tower 21*a* serving as a desulfurizer is an absorption tower of the liquid column type which is provided at the bottom with a tank 41 for holding an absorbing fluid E having an absorbent (i.e., limestone) suspended therein (hereinafter referred to as absorbent slurry E) and which has a gas-liquid contact region extending above tank 41 and serving to bring flue gas into gas-liquid contact with the slurry within tank 41.

This absorption tower 21*a* is a so-called counterflow absorption tower in which a flue gas inlet section 42 for introducing flue gas is formed in its lower part and a flue gas outlet section 43 for discharging the desulfurized flue gas A1 is formed in its upper end, so that the flue gas enters from the lower part of the absorption tower and flows upward.

A mist eliminator 43*a* is installed in flue gas outlet section 43. This mist eliminator 43*a* serves to collect any mist produced as a result of gas-liquid contact and entrained by the flue gas, so that a large amount of mist containing sulfur dioxide, ammonia and the like may not be discharged together with the desulfurized flue gas A1. In this embodiment, the mist collected by this mist eliminator 43*a* is allowed to flow down from its lower end and return directly to tank 41.

Moreover, in absorption tower 21*a*, a plurality of spray pipes 44 are disposed in parallel. In these spray pipes 44, a plurality of nozzles (not shown) for injecting the slurry within tank 41 upward in the form of liquid columns are formed.

Furthermore, a circulating pump 45 for withdrawing and raising the absorbent slurry within tank 41 is installed on the outside of tank 41. Thus, the slurry is fed to spray pipes 44 through a circulation line 46.

In the embodiment illustrated in FIG. 3, tank 41 is provided with a means for blowing air F for oxidizing use in the form of fine bubbles while agitating the slurry within tank 41. This means comprises an agitator 47 and an air supply pipe 48 for blowing air F into the slurry in the vicinity of the agitating blades of agitator 47. Thus, the absorbent slurry having sulfur dioxide absorbed therein is brought into efficient contact with the air in tank 41 and thereby completely oxidized to form gypsum. More specifically, the absorbent slurry injected from spray pipes 44 within absorption tower 21*a* flows downward while absorbing sulfur dioxide and dust (containing ammonium salts such as ammonium sulfate) and, moreover, ammonia gas as a result of gas-liquid contact with flue gas, and enters tank 41 where it is oxidized by contact with a large number of air bubbles blown thereinto while being agitated by means of agitator 47 and air supply pipe 48, and then undergoes a neutralization reaction to become a slurry containing gypsum at a high concentration. The dominant reactions occurring in the course of these treatments are represented by the aforementioned reaction formulas (1) to (3).

Thus, a large amount of gypsum, a small amount of limestone (used as the absorbent), and a slight amount of dust and ammonia collected from the flue gas are steadily suspended or dissolved in the slurry within tank 41. In this embodiment, the slurry within tank 41 is withdrawn and fed to a solid-liquid separator 49 through a pipe line 46*a* branching from circulation line 46. The slurry is filtered in solid-liquid separator 49, so that gypsum G having a low water content is recovered. On the other hand, a portion H1 of the filtrate from solid-liquid separator 49 is fed to a slurry preparation tank 52 as water constituting absorbent slurry E, and the remainder is discharged as desulfurization waste water H2 in order to prevent the accumulation of impurities.

Since the ammonia and ammonium salts (such as ammonium sulfate) absorbed from the flue gas have high solubilities, most of them are contained in the liquid phase of slurry E and eventually discharged together with desulfurization waste water H2.

In this embodiment, a slurry containing limestone as the absorbent is fed from slurry preparation tank 52 to tank 41 during operation. This slurry preparation tank 52 is equipped with a stirrer 53 and serves to prepare absorbent slurry E by mixing powdered limestone I introduced from a silo (not shown) with filtrate H1 fed as described above, and stirring this mixture. Absorbent slurry E within slurry preparation tank 52 is suitably fed to tank 41 by means of a slurry pump 54. Moreover, in order to make up for the water gradually lost owing to evaporation in absorption tower 21*a* or the like, make-up water (such as industrial water) is suitably supplied, for example, to tank 41 or slurry preparation tank 52.

During operation, the flow rate of the aforesaid make-up water supplied to tank 41, the flow rate of the slurry withdrawn through pipe line 46*a*, and the like are suitably controlled. Thus, tank 41 is maintained in such a state that the slurry containing gypsum and the absorbent at predetermined concentrations is always stored therein at a level within certain limits.

Also during operation, in order to maintain the degree of desulfurization and the purity of gypsum at a high level, the boiler load (i.e., the flow rate of flue gas A), the sulfur dioxide concentration in the flue gas introduced into absorption tower 21*a*, the pH and limestone concentration of the absorbent slurry within tank 41, and the like are detected with sensors. On the basis of the results of detection, the feed rate of limestone to tank 41 and other parameters are suitably controlled by means of a controller (not shown). Conventionally, the pH of the absorbent slurry within tank 41 is usually adjusted to about 6.0 so that highly pure gypsum may be formed by accelerating the above-described oxidation reaction while maintaining the high capacity to absorb sulfur dioxide.

Furthermore, as a means for preventing the ammonia injected in excess from remaining in the desulfurized flue gas A1, spray pipes 55 are installed above spray pipes 44. These spray pipes 55 serve to inject a liquid J (which may be in the form of a slurry) having a lower pH value than the slurry within tank 41 into absorption tower 21a and thereby create, in the upper part of absorption tower 21a, a region which does not allow ammonia to be easily released into the gaseous phase.

For example, liquid J injected from spray pipes 55 comprises a dilute solution of sulfuric acid, and its pH is adjusted to a value (e.g., 4.0 to 5.0) at which ammonia is not easily released into the flue gas.

In the above-described construction, the flue gas introduced into absorption tower 21a through flue gas inlet section 42 is first brought into gas-liquid contact with the slurry injected from spray pipes 44 in the form of liquid columns, and then brought into gas-liquid contact with the liquid injected from spray pipes 55. Thus, dust and ammonia, together with sulfur dioxide, are absorbed or captured.

During this process, the liquid injected from spray pipes 55 in the outlet section (or upper end) of absorption tower 21a is adjusted to a pH value at which ammonia is not easily released into the flue gas. Consequently, the partial pressure of ammonia is depressed in the upper part of absorption tower 21a, so that the phenomenon in which the ammonia once dissolved in the liquid phase of the slurry is reversely released into the flue gas in the upper part of the absorption tower is avoided.

Thus, desulfurized flue gas A1 having very low concentrations of sulfur dioxide, dust and ammonia is ultimately discharged from flue gas outlet section 43 formed at the upper end of absorption tower 21a. In this case, calculations made by the present inventors have revealed that the degree of removal of ammonia is about 90%. Consequently, in spite of the construction in which an excessive amount of ammonia is positively injected, little ammonia is contained in treated flue gas D (FIG. 2) and no problem with ammonia emission into the atmosphere arises.

However, it is desirable from the viewpoint of air pollution prevention to minimize the ammonia concentration in treated flue gas D emitted into the atmosphere. Accordingly, there has been a demand for a flue gas treating technique which can achieve a reduction in equipment size and a high degree of desulfurization and, moreover, can minimize the amount of ammonia emitted.

Next, the construction of the exemplary no-waste water disposal system illustrated in FIG. 4 is described below. This is an example relating to the treatment of flue gas from an oil-fired boiler. In this case, dust K collected from flue gas by dry electrostatic precipitator 5 illustrated in FIGS. 2 and 3 contains, in addition to unburned carbon constituting its principal component, impurities such as vanadium (which is a toxic heavy metal) and magnesium, ammonium sulfate formed from the injected ammonia and $SO_3$ present in the flue gas, and the like.

In this system, as illustrated in FIG. 4, desulfurization waste water H2 shown in FIG. 3 is first introduced into a mixing tank 61 where it is stirred and mixed with dust K fed from dry electrostatic precipitator 5 to form a mixed slurry S1. In this step, ammonia and ammonium sulfate contained in dust K are dissolved in the liquid phase of slurry S1, and most of them exist as sulfate ion or ammonium ion, similarly to those contained in waste water H2. Then, mixed slurry S1 is transferred to a pH adjustment/reduction tank 62 where an acid L [e.g., sulfuric acid ($H_2SO_4$)] is added thereto. Thus, mixed slurry S1 is adjusted to a pH value (of about 2 or below) which permits the reduction of vanadium. Moreover, a reducing agent M [e.g., sodium sulfite ($Na_2SO_3$)] is added to and mixed with the slurry. Thus, pentavalent vanadium present in the slurry is reduced to its tetravalent state according to the following reaction formula (5), so that the vanadium is dissolved in the liquid phase.

$$2VO_2^+ + SO_3^{2-} + 2H^+ \rightarrow 2VO^{2+} + SO_4^{2-} + H_2O \tag{5}$$

Then, mixed slurry S2 having undergone the reduction of vanadium is transferred to a precipitation tank 63 where ammonia B3 (which will be described later) is added to and mixed with the slurry. In this step, tetravalent vanadium present in the slurry reacts with ammonia according to the following reaction formula (6), and the resulting product precipitates.

$$VO^{2+} + 2NH_4OH \rightarrow VO(OH)_2 + 2NH_4^+ \tag{6}$$

After being treated for the precipitation of vanadium, mixed slurry S3 is withdrawn from precipitation tank 63 and transferred to a solid-liquid separator 65 comprising a flocculating settler and/or a vacuum type belt filter by means of a slurry pump 64. Thus, solid matter N is separated therefrom in the form of sludge or cake. The separated solid matter N consists essentially of unburned carbon present in dust K, and additionally contains the precipitated vanadium.

Then, waste liquor S4 from which solid matter containing vanadium has been removed is transferred to a neutralization tank 66 where a chemical agent O [e.g., slaked lime (Ca$(OH)_2$)] and return waste liquor P (which will be described later) are added thereto with stirring. Thus, sulfur ion and ammonium ion present in the waste liquor are converted into gypsum or ammonium hydroxide.

The resulting slurry S5, which now contains gypsum as a solid component and ammonium hydroxide, is then transferred to a primary concentrator 67 where ammonia B1 is separated therefrom by evaporation. The resulting slurry $S_6$ containing gypsum and other solid matter at high concentrations is withdrawn therefrom by means of a slurry pump 68.

Primary concentrator 67 consists of an evaporator 67a, a heater 67b and a circulating pump 67c, and functions to heat the slurry with hot steam W1 generated, for example, in a boiler of an electric power plant and thereby evaporate water B1 containing ammonia.

Besides gypsum, the solid matter contained in slurry S6 includes mainly magnesium hydroxide [Mg$(OH)_2$]. This magnesium hydroxide is formed by the combination of magnesium present in dust K as an impurity with hydroxide ion present in the slurry.

Subsequently, this slurry S6 is introduced into a solid separator 69 comprising a cyclone or a sedimentation centrifuge, where slurry S6 is separated into a slurry S7 containing chiefly gypsum (coarsely particulate solid matter) and a slurry S8 containing other finely particulate solid matter (including mainly the above-described magnesium hydroxide). Slurry S7 is returned to absorption tower tank 41 constituting the desulfurizer illustrated in FIG. 3. On the other hand, a portion of slurry S8 is dehydrated in a dehydrator (or secondary concentrator) 70, and the resulting solid matter containing chiefly magnesium hydroxide is discharged as sludge Q.

Of slurry S8, the remaining portion not fed to dehydrator 70 is returned to neutralization tank 66 as return waste liquor P.

Ammonia water B1 produced by evaporation in primary concentrator 67 is cooled and condensed in a cooler 71 using cooling water W2 as the coolant, and stored in a storage tank 72.

Since ammonia water B1 within storage tank 72 usually has a low concentration of about 3–6%, it is fed to an ammonia concentrator 74 by means of a pump 73 and concentrated therein to yield ammonia water having a concentration of 10–20%. A portion of this ammonia water is gasified in a vaporizer 75, and the resulting ammonia B2 is injected into the flue gas in the previously described denitrator 2 as ammonia B containing steam W3. The remaining portion of the ammonia water is fed to the aforesaid precipitation tank 63 as ammonia B3.

In the above-described no-waste water disposal system, desulfurization waste water H2 resulting from the desulfurization operation is treated by mixing it with the removed dust K, so that an improvement in handleability is achieved. The resulting mixed slurry is subjected to a series of treatments for the reduction, precipitation and solid-liquid separation of vanadium present therein, and the separated vanadium is discharged as sludge. Moreover, the mixed slurry concentrated and treated in such a way that gypsum, water and ammonia are finally returned to the flue gas or to the upstream side of the system (e.g., the absorption tower constituting the desulfurizer). Thus, it becomes possible to use ammonia in a circulating manner and realize a so-called no-waste water closed system in which no waste water to be discharged is produced. This eliminates the need of waste water treatment prior to its discharge and enables the effective utilization of ammonia.

Experiments

Now, some experiments carried out by the present inventors are described below. The purpose of these experiments is to demonstrate that the formation of scale on the inner surfaces (e.g., heat transfer surfaces) of the heat exchanger for the heat recovery step due to acid ammonium sulfate is suppressed when an excessive amount of ammonia is injected according to one feature of the present invention and a non-leakage type heat exchanger of shell-and-tube structure is used as the heat exchanger.

Figure 6:
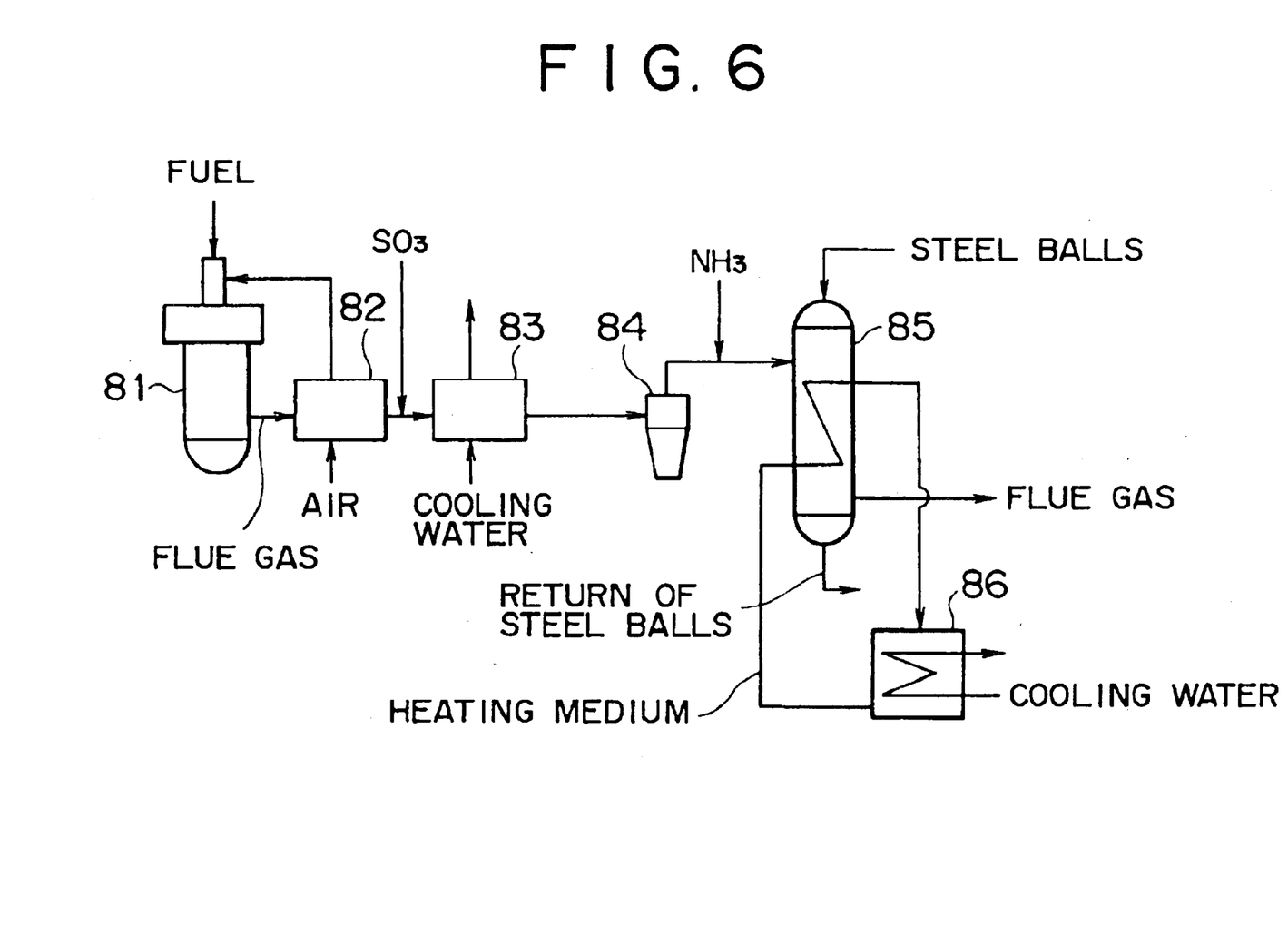
FIG. 6 is a schematic view illustrating an experimental apparatus for demonstrating an effect of the present invention (i.e., the minimization of a deposit due to $SO_3$ in flue gas)

First of all, an experimental apparatus illustrated in FIG. 6 was used. Specifically, an air heater 82 and a cooler 83 were installed downstream of a combustion furnace 81. Moreover, a cyclone 84 for separating and removing dust such as unburned carbon was installed downstream of them. The flue gas leaving this cyclone 84 was introduced into a non-leakage type heat exchanger 85 of shell-and-tube structure. In this case, the flue gas was passed through heat exchanger 85 on its shell side (i.e., on the outside of the heating tubes), while a heating medium was passed through the heating tubes of heat exchanger 85. The heating medium heated by the heat of the flue gas in heat exchanger 85 was cooled and regenerated in a cooler 86 using cooling water.

The $SO_3$ concentration in the flue gas was regulated by injecting $SO_3$ into the flue gas at a position downstream of air heater 82 and upstream of cooler 83. Moreover, the ammonia concentration in the flue gas was regulated by injecting ammonia into the flue gas at a position downstream of cyclone 84 and upstream of heat exchanger 85. Heat exchanger 85 was capable of so-called steel ball cleaning by scattering steel balls continuously on its shell side, and was subjected to steel ball cleaning tests as required.

Other experimental conditions were as follows.

(Fuel)
  Type: Fuel oil A.
  Combustion rate: 15 liters/hr.
(Flue Gas)
  Flow rate: 200 $m^3N/h$.
  $SO_3$ concentration: 25 ppm.
  $NH_3$ concentration: 63 ppm.
  Temperature at the outlet of the cyclone: 170° C.
  Temperature at the inlet/outlet of the heat exchanger: 130/90° C.
(Heating Medium)
  Inlet temperature: 75° C.
(Steel Balls)
  Scattering rate: 2,280 $kg/m^2 \cdot h$.

In this case, the ammonia concentration in the flue gas was determined to be 63 (=50+13) ppm so that it would be in excess of the equivalent amount required for the formation of ammonium sulfate [$(NH_4)_2SO_4$] as a result of reaction with $SO_3$ by 13 ppm. The aforesaid equivalent amount is equal to twice the number of moles of $SO_3$ and, in this case, corresponded to a concentration of 50 (=25×2) ppm.

Under the above-described conditions, the experimental apparatus was continuously operated for 83 hours without steel ball cleaning. Thereafter, steel ball cleaning was carried out for 2 hours.

Figure 7:
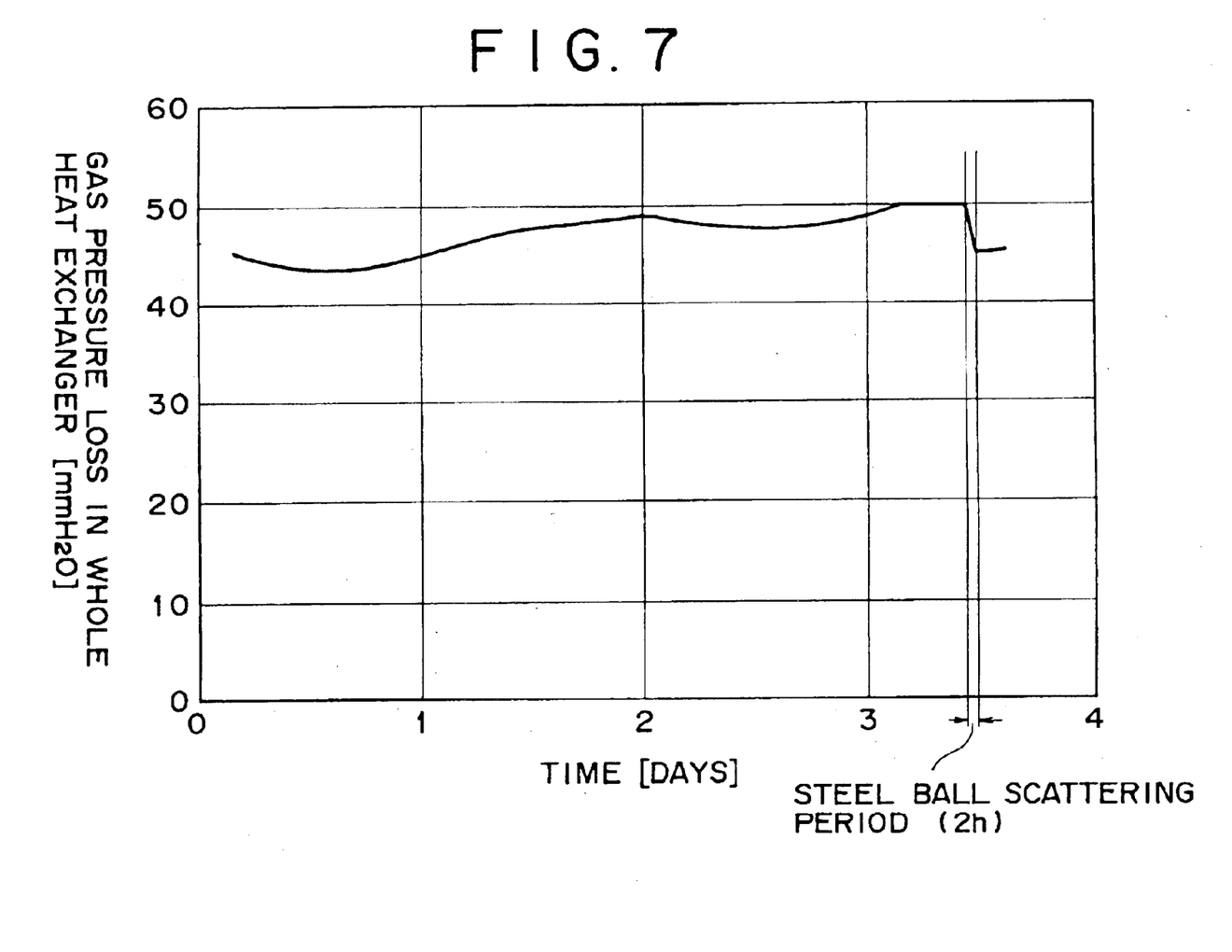
FIG. 7 is a graph showing experimental results (changes in the gas pressure loss in the heat exchanger) for demonstrating an effect of the present invention (the minimization of a deposit due to $SO_3$ in flue gas)
Figure 8:
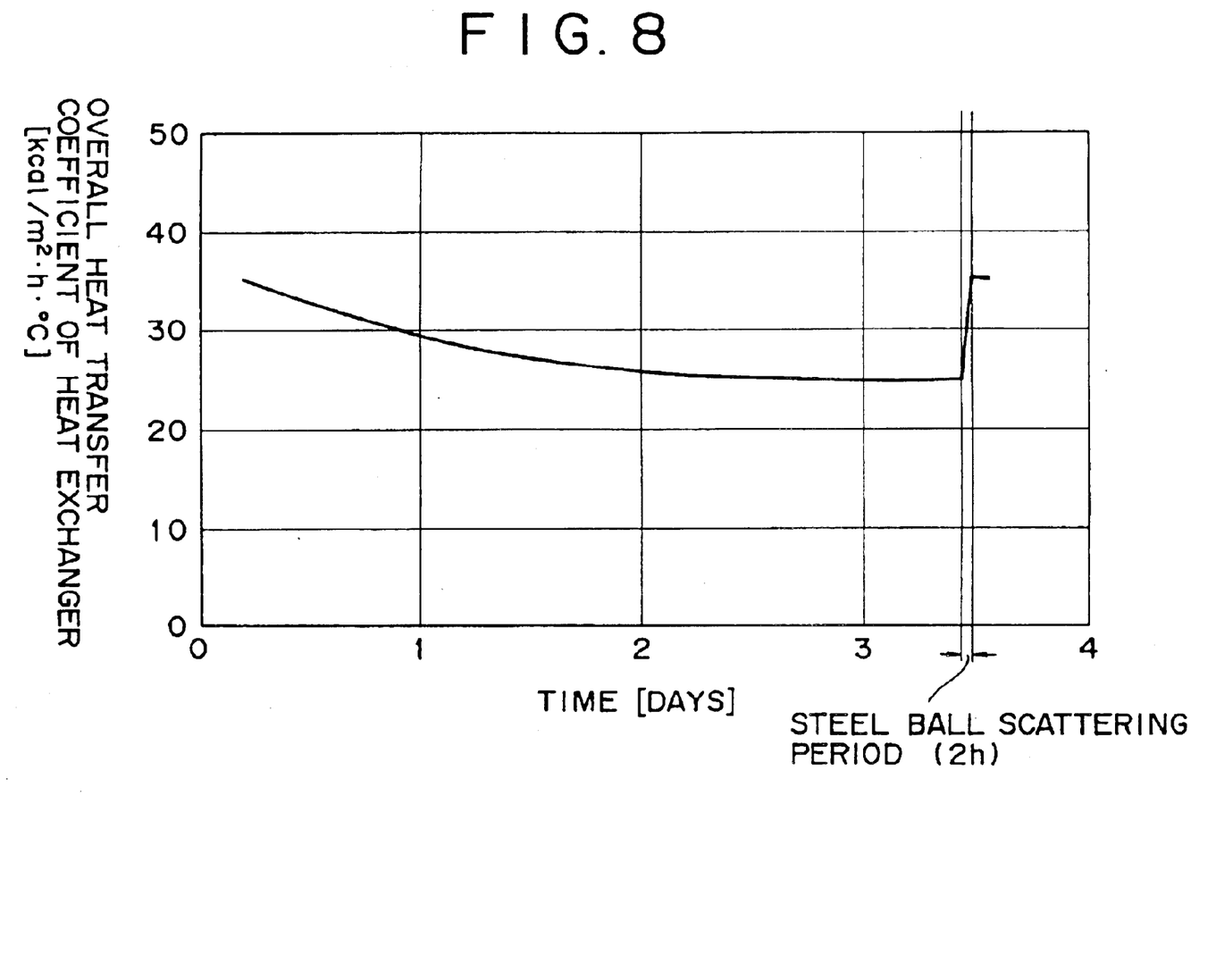
FIG. 8 is a graph showing experimental results (changes in the overall heat transfer coefficient of the heat exchanger) for demonstrating an effect of the present invention (the minimization of a deposit due to $SO_3$ in flue gas)

FIG. 7 shows the results of actual measurement of changes in the gas pressure loss in heat exchanger 85, and FIG. 8 shows the results of actual measurement of changes in the overall heat transfer coefficient of heat exchanger 85 which serves as an indication of its heat transfer capability.

As can be seen from these results, the changes in gas pressure loss and overall heat transfer coefficient were relatively slight even after 83 hours' continuous operation. Moreover, they can be completely restored to their initial levels by steel ball cleaning.

Moreover, when the surfaces of the heating tubes of heat exchanger 85 after 83 hours' continuous operation were photographed and visually observed with the naked eye, the accumulation of a deposit was slight. On analysis, this deposit includes mainly an ammonium sulfate type compound having an $NH_4/SO_4$ molar ratio of 1.5 to 1.9.

Thus, it can be seen that, if ammonia is injected in such an amount as to be in excess of the $SO_3$ concentration by 13 ppm or more, the production of acid ammonium sulfate is suppressed and this greatly facilitates the operation for removing a deposit.

It is to be understood that the present invention is not limited to the above-described embodiments, but may also be practice in various other ways.

For example, the injection of ammonia need not only be carried out in the denitrator (or the denitration step), but may also be carried out at any point downstream of the denitrator and upstream of the absorption tower. By way of example, in the system of FIG. 2, ammonia may be injected into the flue gas in flue 4 for the purpose of capturing $SO_3$ and enhancing the desulfurization capability, or ammonia may be injected into the flue gas in flue 25 (on the downstream side of dry electrostatic precipitator 5) for the purpose of enhancing the desulfurization capability and the like.

In this case, in order to enhance the desulfurization capability of the absorption tower, the amount of ammonia injected in the denitration step and/or the amount of ammonia injected at the point downstream of the denitration step may be determined so that it is in excess of the equivalent amount required for denitration or the equivalent amount for $SO_3$ and, therefore, ammonia or an ammonium salt (e.g., ammonium sulfate) will remain in the flue gas introduced into the desulfurization step.

Moreover, in order to fully suppress the formation of scale due to $SO_3$ in air heater 31 and the heat recovery section 24 of the gas-gas heater, the amount of ammonia injected in the denitration step and/or the amount of ammonia injected at the point downstream of the denitration step may be determined so as to be on such an excessive level that the concentration of ammonia remaining in the flue gas introduced into these heat exchangers will be in excess of the $SO_3$ concentration in this flue gas by 13 ppm or more.

Figure 2:
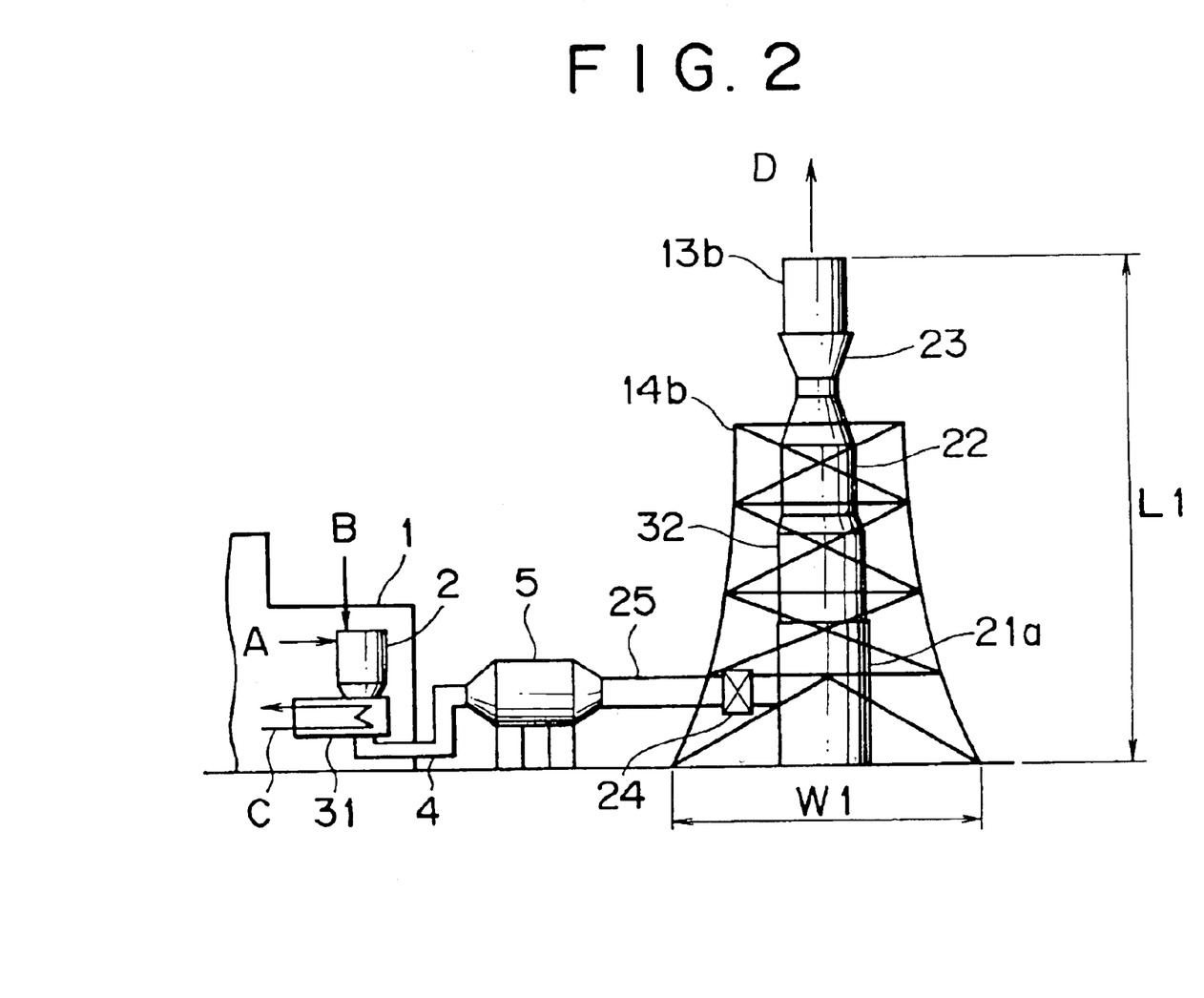
FIG. 2 is a schematic view illustrating a flue gas treating system in accordance with a second embodiment of the present invention.

Furthermore, air heater 31 and the heat recovery section 24 of the gas-gas heater are separately installed, for example, in the previously described embodiment of FIG. 2. However, they may be combined into a single unit. That is, the system may be constructed in such a way that air C fed to the boiler is heated by the heat recovered in a heat exchanger installed, for example, at the position of air heater 31 (FIG. 2), and a portion of the heating medium is conducted to the reheating section 22 of the gas-gas heater and used to heat treated flue gas D.

Even where the air heater and the heat recovery section of the gas-gas heater are separately installed, the heat recovery section of the gas-gas heater may be installed at a position upstream of electrostatic precipitator 5.

In this connection, if heat recovery from the flue gas is fully carried out on the upstream side of electrostatic precipitator 5 and the temperature of the flue gas introduced into electrostatic precipitator 5 is further reduced, this is advantageous especially in the case of flue gas from a coal-fired boiler, because the degree of removal of dust (e.g., fly ash) in electrostatic precipitator 5 is markedly improved on the basis of its increased resistivity.

What is claimed is:

1. A flue gas treating process for treating a flue gas comprising nitrogen oxides and sulfur oxides, the process comprising:

denitrating the flue gas with a denitrator;

injecting ammonia into the flue gas prior to introducing the gas into an absorption tower, wherein the amount of ammonia is injected in such a quantity that an excessive level of ammonia or an ammonium salt will remain in the flue gas when the flue gas is subsequently contacted with an absorbing fluid;

introducing the flue gas into an absorption tower; and desulfurizing the flue gas in the absorption tower by contacting the flue gas with the absorbing fluid, wherein the absorbing fluid absorbs sulfur oxides, spraying the flue gas with a liquid having a higher acidity than the absorbing fluid, wherein the spraying is done downstream of the desulfurization step and in the absorption tower, whereby ammonia remaining in the flue gas is absorbed in the absorption tower, recovering heat from the flue gas, heating the flue gas leaving the absorption tower to a temperature favorable for emission into the atmosphere by using at least a part of the heat recovered in the heat exchanger; and pressurizing the flue gas with a fan, wherein pressure loss in the absorption tower or reheating section is counter acted, wherein the absorption tower, the reheating section and the fan are arranged together on a vertical axis in the form of a stack and wherein the amount of ammonia injected is at a concentration so that the amount of ammonia remaining in the flue gas after the injection step will be not less than 30 ppm.

2. A flue gas treating process according to claim 1, wherein the flue gas discharged into the environment has been denitrated by about 90%.

3. A flue gas treating process according to claim 1, further comprising:

introducing the flue gas leaving the denitration step into a heat exchanger on the upstream side of the absorption tower.

4. A flue gas treating process according to claim 3, wherein the heat exchanger is a non-leakage shell-and-tube heat exchanger.

5. A flue gas treating process according to claim 1, wherein the amount of ammonia injected is at a concentration so that the concentration of ammonia remaining in the flue gas when introduced into the heat exchanger will be in excess of the $SO_3$ concentration by 13 ppm or more.

6. A flue gas treating process according to claim 3, wherein the amount of ammonia injected is at a concentration so that the concentration of ammonia remaining in the flue gas introduced when injected into the heat exchanger will be in excess of the $SO_3$ concentration in the flue gas by 13 ppm or more.

7. A flue gas treating process according to claim 5, wherein the denitrator does not have an ammonia decomposition catalyst.

8. A flue gas treating process according to claim 1, wherein the pH of the absorbing fluid is about 6.0 and the pH of the downstream liquid is from about 4.0 to about 5.0.

9. A flue gas treating process according to claim 1, further comprising:

removing dust of the flue gas upstream of the absorption tower with a dry electrostatic precipitator, wherein the dry electrostatic precipitator is downstream of the ammonia injection.

10. A flue gas treating process according to claim 1, further comprising:

removing dust of the flue gas downstream of the absorption tower with a wet electrostatic precipitator.

11. A flue gas treating process according to claim 9, further comprising:

removing dust of the flue gas downstream of the absorption tower with a wet electrostatic precipitator.

12. A flue gas treating process according to claim 1, wherein ammonia is injected into the flue gas at a point downstream of the denitrator.

13. A flue gas treating process according to claim 1, wherein ammonia is injected into the flue gas in the denitrator.

14. A flue gas treating process according to claim 1, wherein the absorbing fluid comprises 150 mmol/liter or more ammonium ion.

15. A flue gas treating process according to claim 14, wherein the absorbing fluid absorbs about 95% of the sulfur oxides.

16. A flue gas treating process according to claim 1 or 2, wherein the stack is about 90 meters high.

17. A flue gas treating process according to claim 16, wherein the stack is supported by a framework having a width of about 25 meters.

* * * * *